Figure 1:
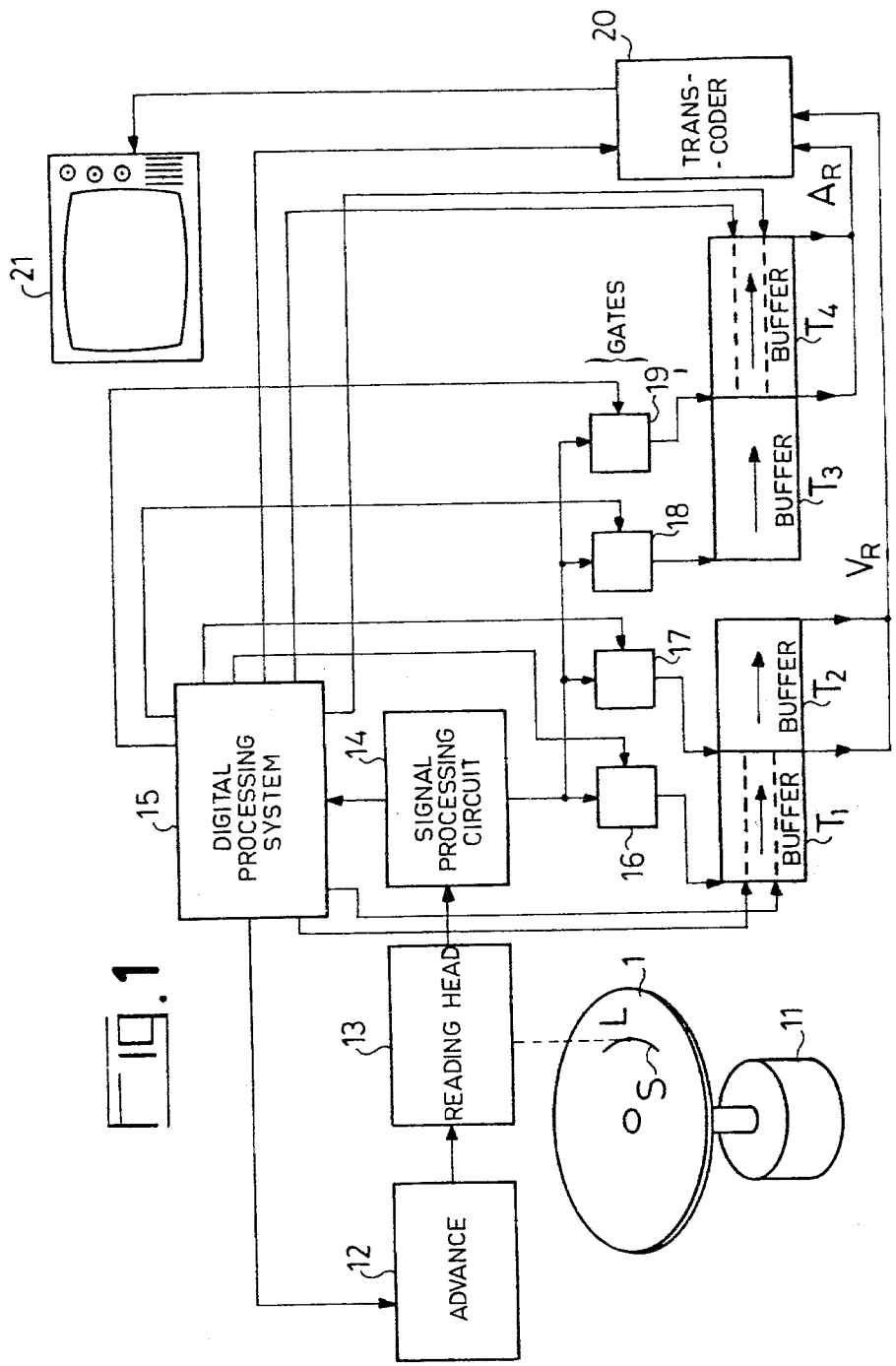

United States Patent [19]

Lainez

[11] 4,347,527

[45] Aug. 31, 1982

[54] VIDEO RECORDING ON DISK AND DEVICE FOR THE REPETITIVE READING OF SUCH A RECORDING

[75] Inventor: Lucien Lainez, Paris, France

[73] Assignee: Thomson-Brandt, Paris, France

[21] Appl. No.: 178,127

[22] Filed: Aug. 14, 1980

[30] Foreign Application Priority Data

Aug. 17, 1979 [FR] France ............................... 79 20887

[51] Int. Cl.³ ................................................ A04N 5/76
[52] U.S. Cl. ........................... 358/4; 358/128.5;
     360/19; 360/10; 360/33; 360/9
[58] Field of Search ................. 360/9, 10, 19, 33, 8;
     358/128.6, 128.5, 127, 143, 4; 179/15.55 T;
     369/102, 111

[56] References Cited

U.S. PATENT DOCUMENTS

| | | | | |
|---|---|---|---|---|
| 3,789,137 | 1/1974 | Newell | ................................ | 360/19 |
| 3,878,560 | 4/1975 | Ramage | ................................ | 360/10 |
| 3,909,512 | 9/1975 | Omori | ................................ | 360/9 |
| 4,065,795 | 12/1977 | Shutterly | ................................ | 360/9 |
| 4,161,753 | 7/1979 | Bailey | ................................ | 360/9 |
| 4,227,213 | 10/1980 | Isobe | ................................ | 360/19 |

*Primary Examiner*—Bernard Konick
*Assistant Examiner*—Alan Zaber
*Attorney, Agent, or Firm*—Roland Plottel

[57] ABSTRACT

The invention relates to recordings in the form of disks and to the reading devices making it possible to repetitively read a still with its sound accompaniment.

The invention relates to a recording where the video and audio data form interlaced blocks located in equal sectors of the same turn. The repetitive reading device utilizes buffer stores in which are loaded the video and audio data blocks. The reading of the buffer stores takes place at a reduced speed in order to reconstitute uninterrupted sequences of video and audio data.

The invention is more particularly applicable to the storage of pictures on disk with their sound accompaniment with a view, for example, of giving programmed audio-visual instruction or teaching.

12 Claims, 26 Drawing Figures

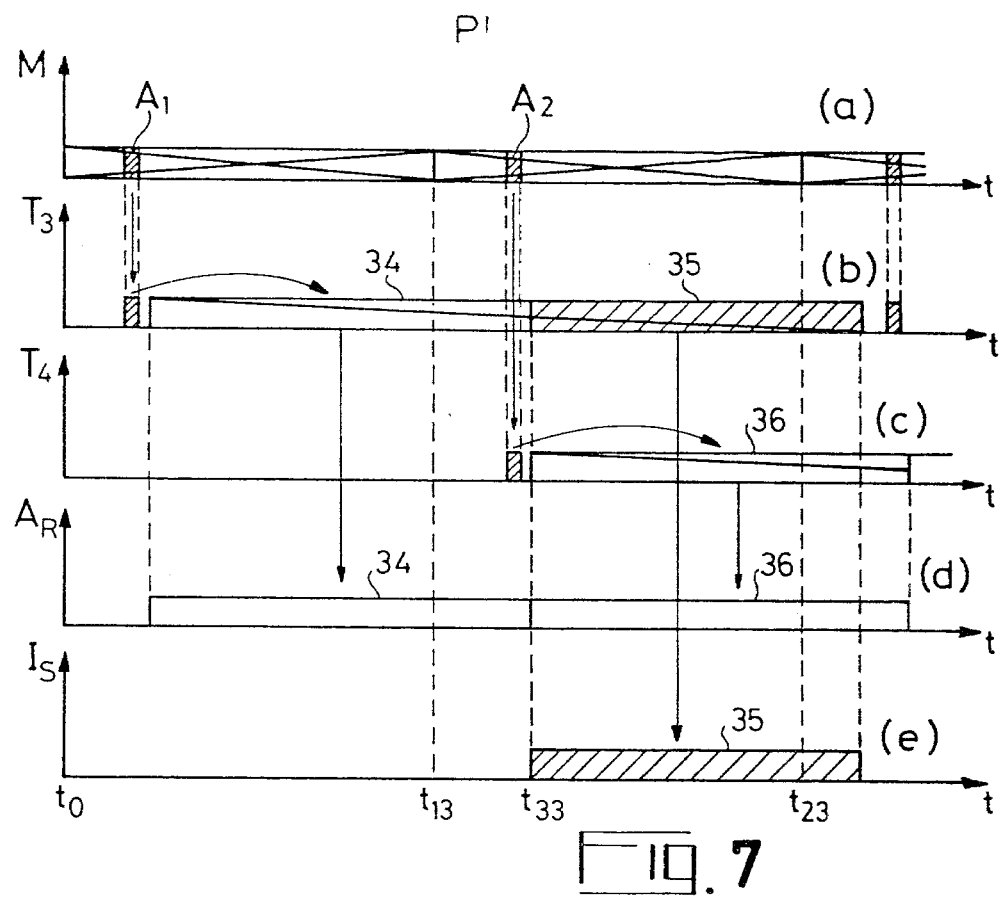
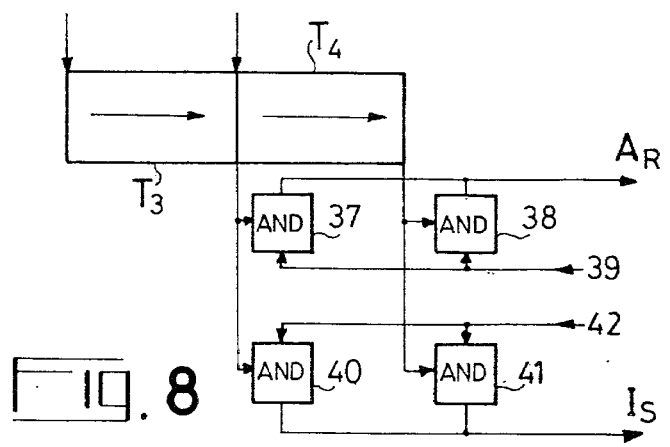

VIDEO RECORDING ON DISK AND DEVICE FOR THE REPETITIVE READING OF SUCH A RECORDING

The present invention relates to video recordings and to reading devices permitting stoppage on the picture with sound accompaniment. Various video disk systems have already been designed for the storage and restitution of a conventional film constituted by a sequence of moving pictures accompanied by a sound image, whose duration precisely corresponds to the film unwinding time.

The display of still pictures accompanied by a commentary is another important application of the video disk. Thus, a collection of 30,000 pictures can be stored on one face of the video disk. The restitution of these pictures by optical reading with a track jump after each complete rotation of the disk provides an extremely large collection of pictures.

With regard to the commentary, it is possible to use a magnetic tape reader which operates synchronously with the reading of the selected pictures, but this hybrid solution has disadvantages. One of the disadvantages is that a still picture requires a commentary which can last several seconds. The magnetic recording of commentaries corresponding to pictures stored on one face of the video disk represents a total time of more than 16 hours at the rate of 2 seconds per picture. Moreover, the possibility of random access to a picture is made very complex when it is necessary to extract a suitable sound commentary from a magnetic tape carrying a large number thereof.

In order to obviate these disadvantages, the invention proposes a recording on a disk, such that the video and audio parts are read alternately on the same turn and a reading system in which the repeated reading of the same turn supplies both the desired still and a sound commentary, whose duration can be much longer than the duration of one revolution of the disk. Thus, random access to complex video and audio information is integrally retained. Moreover, the storage and restitution of the information require a single support and a single reader. Finally, this method makes it possible to combine on one disk regions corresponding to moving picture sequences read in conventional manner with their normal sound commentary and regions representing a sequence of stills with sound commentaries having a high integration density. To achieve this result, the invention utilizes sound recording techniques by digitized samples. The processing of the digital signals requires the use of large capacity buffer stores, but in order to reduce the quantity of equipment used, the signals are distributed along the turn in the form of uniform and numerous packets.

The invention therefore relates to an audio-visual recording on a disk of video signals arranged along a track comprising a system of turns, audio signals being associated with the video signals so as to transcribe the sound accompaniment of each of the achromatic or polychromatic pictures stores on the disk, characterized in that in at least one annular reading region of this disk each turn is subdivided into equal sectors each having at least two successive zones in which are respectively provided a block of video data and a block of audio data, the quantity of data contained in each audio data block being adequate to permit the reproduction of a sound accompaniment portion whose duration in real time substantially exceeds the processing time of this audio data block during a reading intended for television.

The invention also relates to a device for the repetitive reading of an audio-visual recording on a disk comprising a reading head associated with displacement means making it possible to re-read a number of times a random turn of the recording, characterized in that it comprises means for the selective transmission of the video and audio data blocks supplied in alternating manner by the reading head so as to load the video and audio buffer stores at the data reading speed, control means ensuring the extraction of data loaded into the store at slower speeds than the reading speed in order to form uninterrupted sequences of video and audio data and transcoder means receiving these data sequences in order to form a composite television signal permitting the restitution of a still with the sound accompaniment associated therewith.

The invention will be better understood from the following description and the attached drawings, wherein show:

FIG. 1 the device for the repetitive reading of a recording in accordance with the invention.

Figure 2:
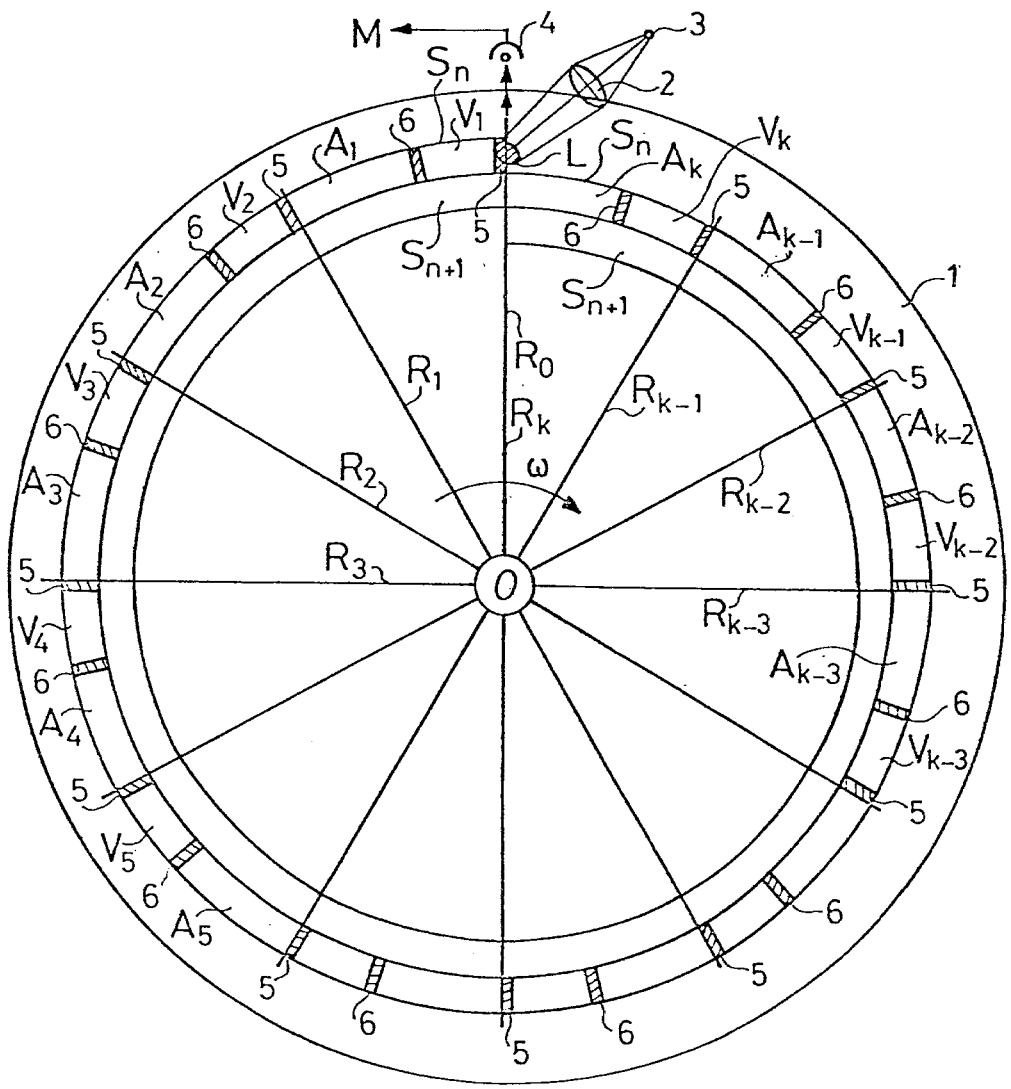

FIG. 2 a possible arrangement of the audio and video data on the surface of a disk according to the invention.

FIGS. 3a-d the constitution of the digital data blocks arranged along the recording track of the disk of FIG. 2.

FIGS. 4a-h are diagrams explaining the operation of the device of FIG. 1.

FIGS. 5a-c are diagrams illustrating a variant of the reading mode for the audio data blocks.

FIGS. 6a-c are diagrams illustrating another variant of the reading mode of the audio data blocks.

FIGS. 7a-e are diagrams showing how it is possible to read the instructions associated with the audio data.

FIG. 8 a detail of the construction of the reading circuit of FIG. 1 providing a sound accompaniment and special signal able to control the running of a programme.

The device shown in FIG. 1 makes it possible to read in a repetitive manner a disk 1 on which has been recorded a track, whose turns S contain an optically legible recording. Disk 1 is placed on a turntable driven by a motor 11 and as a result it rotates at a uniform angular speed $\omega$. A reading spot L produced by a reading head 13 scans one turn S of the recording carried by disk 1. The modulated light which emerges from the portion of disk 1 illuminated by spot L is detected by the reading head 13, which supplies a sequence of electrical signals representing coded digital data. In order to obtain a repetitive reading of each of the turns carried by the disk 1, the reading spot L is radially displaced by means of a positioning device 12. When the track is given a spiral shape, device 12 selects one turn and scans it during a complete revolution, after which it resumes the same scanning operation as a result of a sudden track jump which brings the spot from the end of the turn to its beginning. As a non-limitative example, it has been assumed that the content of an achromatic picture is spread along the length of one turn. The arrowed connection connecting the advance device 12 to the reading head 13 symbolizes the control by which spot L tracks the turn. The data read by the reading are transmitted to a signal processing circuit 14, which re-shapes them and brings them into synchronism with a locally produced train of isochronous pulses. Thus, circuit 14 ensures the sorting of the read data as a function of their nature. Thus, the audio and video data are preceded by digital signals which serve to identify and number them. The identification and numbering signals are transferred to a digital processing system 15 which performs different control functions linked with the positioning of the reading spot L and the data transfers with spreading in time made necessary by the interlacing of the data inscribed on the disk. The audio and video data are transmitted by circuit 14 to a system of gates 16, 17, 18, 19, whose opening is controlled by the digital processing system 15. The video data which have passed through the gates 16 and 17 are respectively loaded into the buffers $T_1$ and $T_2$. The audio data which have passed through gates 18 and 19 are respectively loaded into buffers $T_3$ and $T_4$. The loading of buffers $T_1$, $T_2$, $T_3$, $T_4$ is controlled by the digital processing system 15 at times which are determined as a function of the signals supplied to system 15 by circuit 14. The reading operations by displacement of the buffer memories $T_1$, $T_2$, $T_3$, $T_4$ are also controlled by system 15 so as to bring about the restitution of continuous sequences of video data $V_R$ and audio data $A_R$. These continuous sequences $V_R$ and $A_R$ are unsuitable for directly supplying a television receiver 21, so that it is necessary to provide a transcoder circuit 21. This transcoder circuit is controlled by the processing system 15. It brings about the displacement of the video and audio data and processes a composite television signal in accordance with the standard in force. The television receiver 21 makes it possible to display a still coming from a turn S of disk 1 and to listen to a sound commentary accompanying the still for a time corresponding to a high number of rotations of disk 1. In order not to complicate the diagram of FIG. 1, the control disk is not shown, said disk being used for the selection of the desired picture and its sound accompaniment. This disk is obviously connected to the processing system 15 which receives the numbering of the pictures from circuit 14. System 15 is obviously equipped with digital means, such as an incremental counter and comparators making it possible to mark a turn and indicate there the audio and video data blocks.

FIG. 2 shows in non-limitative exemplified manner the arrangement of data on the surface of a recording 1 according to the invention. The recording track assumes the configuration of a spiral, whereof two contiguous turns $S_n$ and $S_{n+1}$ are shown. The reading of the information carried by the track involves the use of a reading head having a light source 3, a projection lens 2 and a photodetector 4. The reading spot L can have a very small diameter of approximately 1 micron in order to permit the resolution of information elements, for example in depression and projection form, whose minimum dimensions are of the same order of magnitude. For example, the former information is transcribed in the form of a group of pedestals, whose length and spacing are not uniform along the track.

According to the invention, the surface of disk 1 is subdivided into K equal sectors separated by radii or spokes $R_0$ to $R_{k-1}$. The number k is relatively high in order to reduce the capacity of buffer stores $T_1$, $T_2$, $T_3$, $T_4$. For example, 60 equal sectors are used. Each sector of the disk has in the scanning direction a word 5 which serves as a prefix for a video data block $V_1$, $V_2$ . . . $V_{k-1}$, $V_k$ and a word 6 which serves as a prefix for an audio data block $A_1$, $A_2$ . . . $A_{k-1}$, $A_k$. The video data blocks $V_1$ to $V_k$ represent, for example, the compressed information relating to a still which can be read by completely describing turn $S_n$. The audio data blocks $A_1$ to $A_k$ represent the sound accompaniment of the still for a listening time equal to 60 re-reading of turn $S_n$. Thus, for each complete revolution disk 1 all the blocks $V_1$ to $V_k$ are re-used, whilst each audio block is only used once during the 60 revolutions provided for the repetitive reading of the still. If one revolution of disk 1 lasts 1/25 seconds, the listening time can reach 2.4 seconds. Obviously, if a longer listening time is required for a particular picture, it is merely necessary to re-inscribe the same video data on the following turn $S_{n+1}$ with other audio data. This technique tends to reduce the number of separate pictures which it is possible to record on the same disk, but it must not be forgotten that there are 30,000 turns on one face of the disk.

Figure 3:
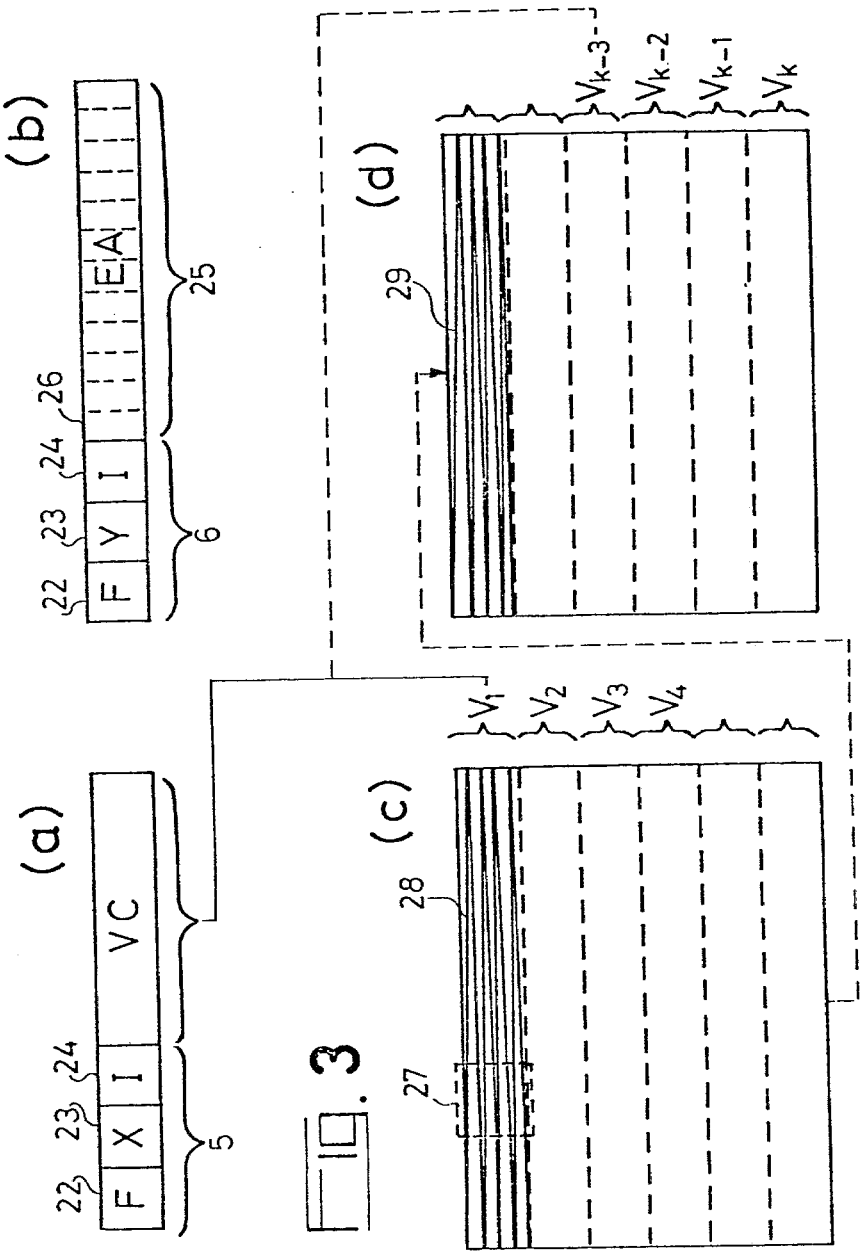

FIG. 3 shows at (c) and (d) the television scanning fields 28 and 29 of a picture. The picture is broken down into horizontal portions, each of which contains a certain number of scanning lines, for example 10. To form the video data block $V_1$, the corresponding portion is broken down into zones 27 which are sampled to form a 10×10 matrix having about 100 analog components. Each matrix 27 undergoes a Walsh-Hadamard transformation presenting it in a representative form which, by limited resolution filtering makes it possible to compress the video information without harming the picture restitution quality. In the case of an achromatic picture, it is possible to show that with only 2.5 bits per sample, it is possible to reproduce a picture which is virtually indistinguishable from the original. In colour televisions, 3.7 bits per sample are required for a comparable quality. One of the video data blocks VC shown at (a) in FIG. 3 will have at the most 5000 bits in the example referred to hereinbefore. The prefix 5 of the block VC has a position 22 occupied by a tear out F, a position 23 occupied by a picture address X and a position 24 indicating by a suitable word I the audio or video data which immediately follow. With regard to the format of an audio data block, it can be seen at (b) in FIG. 3 that the prefix 6 has a similar configuration where Y fulfils the address function and I that of the word designating the quality of the information contained in the actual block 25. Unlike the video data which can be compressed without causing any disadvantageous or problem, the digital transcription of a sound accompaniment can preferably be complete or redundant. In the case of the chosen example, assuming that the sound is sampled 16000 times per second, each sample can be represented by a number having 8 bits. Each audio data block EA will therefore have approximately 5000 bits.

This example shows that it is only necessary to have buffers with a capacity of approximately 5000 bits. Moreover, the space occupied on the turn by the audio data is substantially equal to that occupied by that of the video data, although the listening time is 60 times greater than the duration of a complete revolution of the disk.

Figure 4:
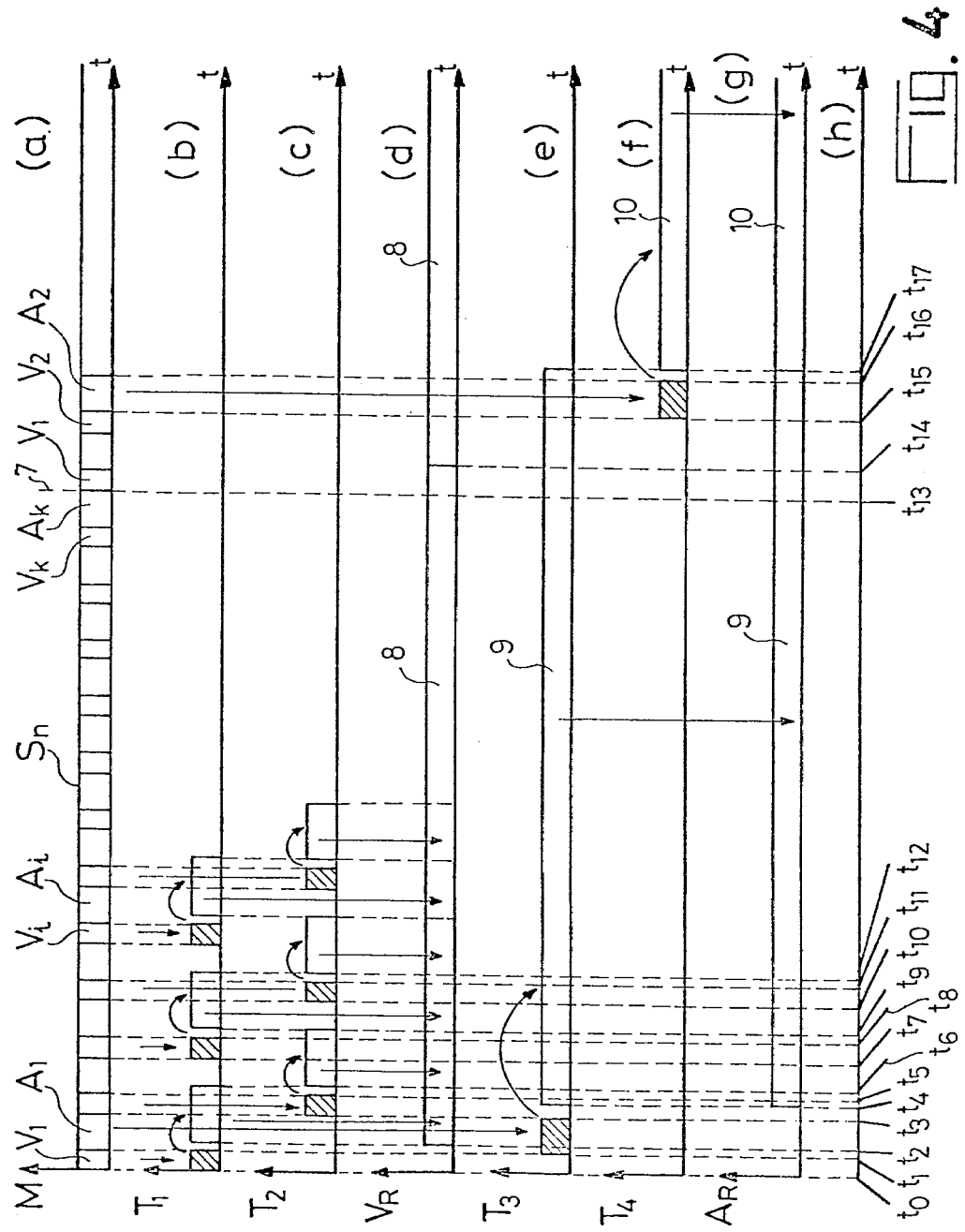

The operation of the reading device of FIG. 1 can be illustrated by means of the explanatory diagram of FIG. 4. A time scale t is represented at h. The reading signal M supplied by the reading head 13 and transmitted via the processing circuit 14 to AND gate 16, 17, 18, 19 is represented at (a) in FIG. 4. A complete revolution of disk 1 occurs between times $t_0$ to $t_{13}$. The reset line 7 marks the start of a second scan of turn $S_n$. The reading signal is broken down into k equal sectors, each comprising a video data block $V_i$ followed by an audio data block $A_j$. The prefixes 5 and 6 have been omitted for reasons of simplicity.

The reading sequence starts therefore with the marking of the first video data block $V_1$ at time $t_0$. This block loads the buffer store $t_1$ as shown at (b) in FIG. 4. At time $t_1$, the loading of buffer $t_1$ is at an end. The buffer $t_1$ can start to be read at a slower speed and its content appears between times $t_2$ and $t_6$ at the video output $V_R$. This transfer is illustrated in (c) and (d) in FIG. 4. However, at time $T_1$ the audio block $A_1$ is loaded into the buffer $t_3$. The loading of audio data is ended at time $t_3$ and at time $t_4$ the content of buffer $T_3$ starts to be transferred at a greatly reduced speed to the audio output $A_R$. This transfer is illustrated at (e) and (g) in FIG. 4 and ends at time $t_{17}$. The reading of the second block of video data starts at time $t_4$ and this block is loaded into buffer $T_2$, because buffer $T_1$ is not available. At time $t_5$, the loading of buffer $T_2$ is at an end and transfer takes place towards the video output $V_R$ between times $t_6$ and $t_9$, as illustrated at (c) and (d) in FIG. 4. The reading of the second audio data block $V_2$ will only take place after a complete revolution of disk 1, i.e. between times $t_{15}$ and $t_{16}$. The read data are loaded into buffer $T_4$, because buffer $T_3$ is not available. The transfer of data loaded in buffer $T_4$ to the audio output $A_R$ start at time $t_{17}$, as illustrated at (f) and (g) in FIG. 4. At times $t_7$, $t_8$, $t_9$, $t_{10}$, $t_{11}$, $t_{12}$ the loading and transfer phases of buffers $T_1$ and $T_2$ continues so as to reconstitute the continuous sequence 8 of video data. It can be seen at (d) in FIG. 4 that the sequence 8 has the same duration as a complete revolution of the disk and that it is repeated the same number of times as turn $S_n$ is re-read. During the first revolution of disk 1, a single audio data block is processed in store $T_3$ in order to supply the continuous audio sequence 9 which can be seen at (e) and (g) in FIG. 4. The audio sequence 9 lasts a little longer than a complete revolution of disk 1 and is immediately followed by another sequence of audio data 10 resulting from the reading of buffer $T_4$ loaded with the audio data block $A_2$. Arrows symbolize the various loading and transfer operations, which are controlled by the processing system 15. The displacement controls of buffers $T_1$, $T_2$, $T_3$ and $T_4$ are ordered by timing pulses processed by the processing system 15. According to the contents of prefixes 5 and 6, the processing system 15 organises the successive controls as a result of the incrementation of registers of state and address comparators. Transcoder 20 receives the video sequences 8 and audio sequences 9, 10 and thereafter, in order to once again give them the desired analog form for supplying television receiver 21. This decoding comprises the transformation of the line and field synchronization signals, the digital-analog decoding of the audio signals and, if applicable, the appropriate modulation of the sound and chrominance subcarriers. The detailed description of all these known processing operations obviously falls beyond the scope of the present invention.

Figure 5:
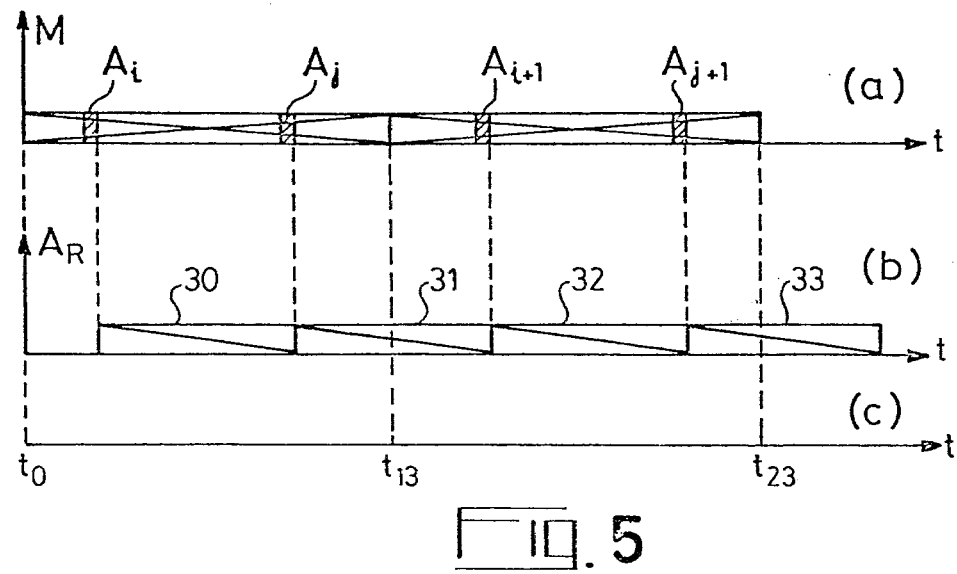

The explanatory diagrams of FIG. 5 show that the reading and transfer of the audio data blocks can take place more than once during each complete revolution of disk 1.

FIG. 5 shows at (c) a scale of time t on which is marked by times $t_0$, $t_{13}$ and $t_{23}$ two successive revolutions of disk 1. Diagram (a) represents the reading signal M on which are marked the data blocks $A_i$, $A_j$, $A_{i+1}$ and $A_{j+1}$ which are loaded into the buffer stores $T_3$ and $T_4$. Diagram (b) represents the sequences 30, 31, 32 and 33 which appear at the audio output $A_R$ after restitution at slow speed. By adopting a resitution speed which is twice slower than that of FIG. 5, it is possible to regroup the sequences 30 and 32 on a first audio channel whilst sequences 31 and 33 are regrouped on a second audio channel. As a result, it is possible to have two separate sound accompaniments for each picture. It also make it possible to introduce a redundancy so that with a single sound accompaniment of two channels it is possible to choose by whichever of the two is less disturbed by a reading fault.

Figure 6:
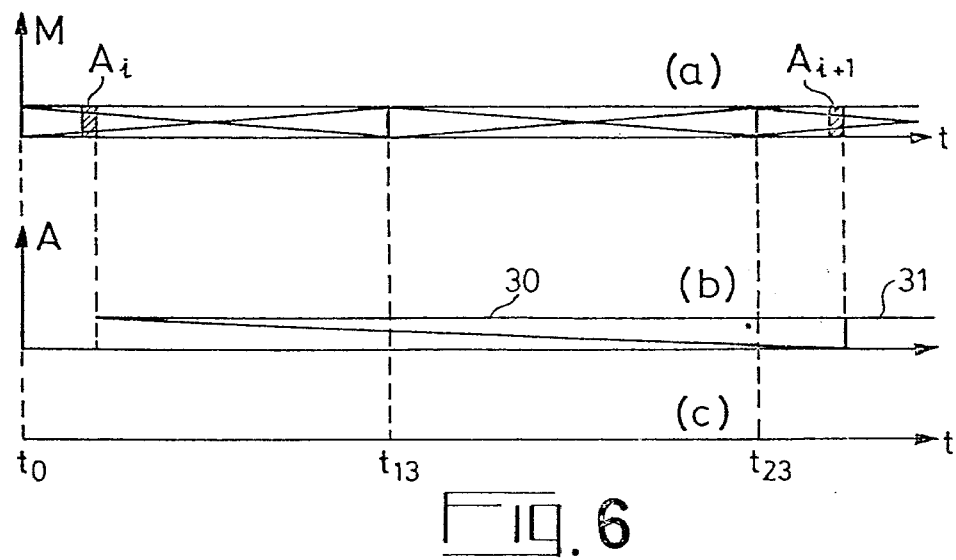

FIG. 6 illustrates another operating case in which an audio data block is transferred every other revolution. The references used are the same as in FIG. 5 and the operation only differs by the extension to two revolutions of the audio data sequences 30 and 31 representing the expansion in time of the data blocks $A_i$ and $A_{i+1}$.

From what has been stated hereinbefore, it is apparent that the video and audio tracks use doubled buffers to cope with the availability problems imposed by the loading-transfer cycles which must permit a precise joining of the reduced speed sequences.

This constraint leads to an increased equipment consumption. However, it can be used to advantage for incorporating into the data blocks of supplementary logic instructions, whose finality is neither audio nor video. Thus, the coupling of a video disk and a microprocessor leads to clear advantages, particularly in the educational field. In the case of programmed audio-visual instruction or teaching, it is advantageous, following a number of pictures accompanied by a commentary, to provide an exercise or simple questions for the user. Supplementary logic instructions make it possible to interrupt a programme and effect various branching operations which can be taken into account by a logic unit associated with the device for reading the recording. FIG. 7 shows how such logic instructions can, for example, be associated with the audio data blocks. The diagram shown at (a) in FIG. 7 indicates reading signals M for two successive revolutions of disk 1 which take place respectively from $t_0$ to $t_{13}$ and $t_{13}$ to $t_{23}$. The data blocks $A_1$ and $A_2$ composed of audio data to which have been added supplementary logic instructions in the form of a suffix. At (b) it is possible to see the loading and transfer of data from block $A_1$ into buffer store $T_3$. The transferred sequence comprises an audio part 34 followed by a so-called logic part 35 at time $t_{33}$. Logic part 35 utilizes a time interval which would otherwise remain free prior to a further loading of the buffer $T_3$. Block $A_2$ can undergo similar processing also in a buffer $T_4$, as is shown at (c) in FIG. 7 where the sequence 36 corresponds to audio data. At (d), it is possible to see that the audio sequences 34 and 36 are joined at time $t_{33}$ at audio output $A_R$. FIG. 7 shows at (d) that sequence 35 can be branched to a logic instruction output $I_S$. The branching of the data as described in FIG. 7 assumes a modification of FIG. 1 illustrated in FIG. 8. The sequences of data supplied by the buffers $T_3$ and $T_4$ supply the AND gates 37, 38, 40, 41, whose outputs are connected to the audio channel $A_R$ and to a supplementary channel $I_S$ which regroups the logic instructions 25. Complementary control signals are applied by lines 39 and 42 in order to branch the audio data and the supplementary data to their respective output channels. Processing system 15 ensures the branching of the data by gates 37, 38, 40 and 41.

Although the foregoing description and the drawings deal with the essential characteristics of the invention applied to the preferred embodiments thereof, it is obvious to the Expert that all necessary modifications of form or detail can be applied thereto without passing beyond the scope of the invention. In particular, the reference to the optical reading system has only been given as an example, because the invention could equally well be applied to all reading systems using a disk and high density data storage. In the same way, the part reserved for the recording of the audio data and the logic instructions is not necessarily of the same order of magnitude as that reserved for the recording of the video data. Thus, the possibility of recording the same picture a number of times on contiguous turns makes it possible to have longer or shorter commentaries without the slightest difficulty and, if desired, a high degree of immunity to reading problems.

I claim:

1. A system for audio-visual recording on a disk of video signals arranged along a track comprising a system of turns, audio signals being associated with the video signals so as to transcribe the sound accompaniment of each of the achromatic or polychromatic pictures stores on the disk, characterized in that in at least one annular reading region of this disk each turn is subdivided into equal sectors each having at least two successive zones in which are respectively provided a block of video data and a block of audio data, the quantity of data contained in each audio data block being adequate to permit the reproduction of a sound accompaniment portion whose duration in real time substantially exceeds the processing time of this audio data block during a reading intended for television.

2. A system for recording according to claim 1, characterized in that each video data block contains data relating to a number of lines of a television field.

3. A system for recording according to either claim 1 or 2, characterized in that the logic instructions are associated with audio data blocks and influence the running of a programme.

4. A system for recording according to claim 3, characterized in that it also has at least one annular region in which is recorded a sequence of moving pictures with its sound accompaniment.

5. A system for recording according to claim 1, characterized in that the video data relating to a still are reproduced on a plurality of contiguous turns, the audio data distributed along these turns representing a sound accompaniment of said still, whose duration is multiplied by a factor equal to the number of turns carrying the repetitive recording of said still.

6. A device for the repetitive reading of an audio-visual recording according to claim 1, comprising a reading head associated with displacement means making it possible to re-read a number of times a random turn of the recording, characterized in that it comprises means for the selective transmission of the video and audio data blocks supplied in alternating manner by the reading head so as to load the video and audio buffer stores at the data reading speed, control means ensuring the extraction of data loaded into the store at slower speeds than the reading speed in order to form uninterrupted sequences of video and audio data and transcoder means receiving these data sequences in order to form a composite television signal permitting the restitution of a still with the sound accompaniment associated therewith.

7. Device according to claim 6, characterized in that the loading of the audio data takes place once per complete revolution of the disk.

8. Device according to claim 6, characterized in that the loading of the audio data takes place at least once per complete revolution of the disk.

9. Device according to claim 6, characterized in that the loading of the audio data takes place more than once per complete revolution of the disk.

10. Device according to claim 6, or 7, or 8 or 9, characterized in that the audio and video buffer stores each have two alternately operating blocks.

11. Device according to claim 10, characterized in that in the case of a disk carrying logic instructions associated with audio data blocks, means for branching audio data and logic instructions are provided at the output from the audio buffer.

12. Device according to claim 6, characterized in that in the case of a disk carrying the recording of the same picture on several contiguous turns, the displacement means are controlled in such a way as to reread each of these turns a number of occasions before automatically passing to the next one.

* * * * *